Figure 1:
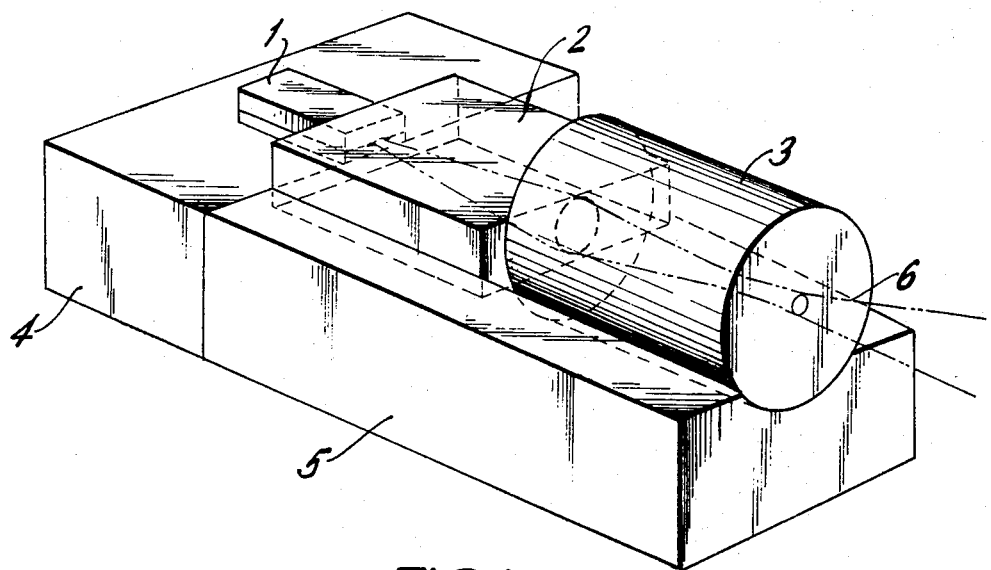

United States Patent
Kobayashi et al.

[11] 3,894,789
[45] July 15, 1975

[54] LIGHT BEAM COUPLER FOR SEMICONDUCTOR LASERS

[75] Inventors: Kohroh Kobayashi; Atsufumi Ueki, both of Tokyo, Japan

[73] Assignee: Nippon Electric Company, Limited, Tokyo, Japan

[22] Filed: July 29, 1974

[21] Appl. No.: 492,770

[52] U.S. Cl. ..... 350/96 C; 350/175 GN; 331/94.5 C
[51] Int. Cl.² .......................................... G02B 5/14
[58] Field of Search .......... 350/96 C, 96 R, 96 WG, 350/175 GN; 331/94.5 C, 94.5 H

[56] References Cited
UNITED STATES PATENTS

| | | | |
|---|---|---|---|
| 3,779,628 | 12/1973 | Kapron et al. | 350/96 C |
| 3,801,181 | 4/1974 | Kitano et al. | 350/96 R |
| 3,803,511 | 4/1974 | Thompson | 331/94.5 C |
| 3,819,249 | 6/1974 | Borner et al. | 350/96 WG |

*Primary Examiner*—David H. Rubin
*Attorney, Agent, or Firm*—Hopgood, Calimafde, Kalil, Blaustein & Lieberman

[57] ABSTRACT

A light coupler is disclosed for use in transforming a flat cross-sectional output beam of a laser into a light beam having a substantially circular cross-section of a spot size for efficient coupling to an optical fiber. The light coupler includes first and second light transmission bodies disposed in an optically coaxial cascade relationship. The first and second light transmission bodies satisfy the conditions $a_x > a_y$ (where $a_y$ can be zero) and $a_x \leq a_y$ (where $a_x$ can be zero), respectively, the symbols $a_x$ and $a_y$ being the focusing parameters representing the values of change in the refractive index distribution in the $x$- and $y$-directions parallel to the thickness and width directions in the cross-section of the laser beam incident upon the light transmission bodies, in a plane normal to the optical axes of the light transmission bodies.

6 Claims, 2 Drawing Figures

3,894,789

LIGHT BEAM COUPLER FOR SEMICONDUCTOR LASERS

The present invention relates generally to light beam couplers, and more particularly to a light beam coupler for coupling an output beam from a semiconductor laser to an optical fiber.

There has been a rapidly growing interest in the use of laser communication systems employing optical fibers, primarily as a result of the development of low-loss optical fibers and long-life semiconductor lasers capable of directly modulating a light beam without resorting to electro-optic crystals.

In order to couple an output laser beam efficiently to an optical fiber and transmit it therethrough with a minimum of loss, the laser beam must have the eigen-mode spot size of the propagation mode of the optical fiber. In gas lasers, for example, the output beam can easily be coupled to an optical fiber by adjusting the spot size through a microscope objective since the laser beam cross-section is substantially circular. However, in a semiconductor laser, it is difficult to couple the output laser beam efficiently to an optical fiber for the following reasons. In a semiconductor laser, the active region is limited in thickness e.g., 0.5 to 1 micron, and in width, e.g., 10 to 20 microns, with the result that the cross-section of the laser beam at the output end is flat in shape and elongated in the direction parallel to the p-n junction plane. Accordingly, the laser beam diverges considerably at the output end of the semiconductor laser. For example, the angle of divergence in a plane normal to the p-n junction, i.e., the angle at which the output light intensity becomes half its maximum value, is as large as $\pm 15°$ to $25°$. This has made it impossible to admit the whole laser beam into the optical fiber no matter how close the optical fiber is linked in cascade with the semiconductor laser. In such structure, the output laser beam is liable to escape from the side walls of the optical fiber, resulting in a considerable amount of radiation loss. Furthermore, because many propagation modes are present for the light beam incident upon the optical fiber, the waveform of the light beam is distorted while it is being transmitted over a long distance; this has hampered the attainment of substantial increase in the capacity of laser beam transmission.

One prior art approach to this problem is the use of a cylindrical lens or a semicylindrical lens. This approach, however, is not practical for the following reason. Assume that an output laser beam with a flat cross-section, e.g., 0.8 micron thick and 6 microns wide, is coupled to an optical fiber with an eigen-mode spot size of 4 microns by the use of a semicylindrical lens. In such case, the focal length of the semicylindrical lens must be 6 microns in the direction of thickness in the cross-section of the beam, and 109 microns in the direction of width thereof. In practice, however, it is hardly feasible to fabricate a semicylindrical lens with such a short focal length.

Another prior art approach involves the use of a light focusing transmission body, which has the property that the refractive index distribution in a plane normal to the optical axis of the light transmission body can be expressed by the following equation:

$$n(x) = n_o(1 - \tfrac{1}{2} a x^2)$$

(1)

where $n_o$ stands for the refractive index at the center axis, and $a$ is the focusing parameter representing the value of change in the refractive index distribution. A light transmission medium with a length $l$ serves as a lens whose focal length $fx$ can be expressed as $$fx = 1/(n_o \sqrt{a} \sin \sqrt{a}l)$$

(2)

This lens has a light focusing function in the $x$-direction. The process of deriving Eqs. (1) and (2) is described in an article by H. Kogelnik in "Bell System Technical Journal" pp. 455 to 493, Vol. 44, No. 1, March, 1965.

Theoretically, the desired sport size can be obtained by the use of a light focusing transmission body in which the change in the refractive index distribution differs in two directions intersecting at right angle in a plane normal to the axis of the light transmission body. In this structure, the condition, $a_x = 10,000$ mm$^{-2}$ and $a_y = 35$ mm$^{-2}$, must be satisfied. (Note: The symbols $a_x$ and $a_y$ are the focusing parameters representing the change in the refractive index distribution in the directions parallel to the thickness and width directions, respectively, in the cross-section of the light beam incident upon an optical fiber used.) Although the condition for $a_y$ can be attained, the condition for $a_x$ is beyond feasibility. Unfortunately, no techniques are available to provide a light transmission body satisfying such conditions.

Therefore, it is an object of the invention to provide a highly efficient, easily manufacturable light beam coupler.

It is another object of the invention to provide a light coupler for efficiently coupling an output beam from a semiconductor laser to an optical fiber.

With these and other objects in view, the present invention provides a light beam coupler for a semiconductor laser, which comprises a first light focusing transmission body for transforming an output beam of a semiconductor laser having a flat cross-section into a light beam having a circular or elliptical cross-section. A second light focusing transmission body transforms the output laser beam with an elliptical cross-section into a light beam with a circular cross-section fitting a given spot size. The first and second light transmission bodies satisfy the conditions $a_x > a_y$ (where $a_y$ can be zero) and $a_x \leq a_y$ (where $a_x$ can be zero) respectively, the symbols $a_x$ and $a_y$ being the focusing parameters representing the values of change in the refractive index distribution in the $x$- and $y$-directions parallel to the thickness and width directions in the cross-section of the laser beam incident upon the light transmission bodies, in a plane normal to the optical axes of the light transmission bodies.

Figure 2:
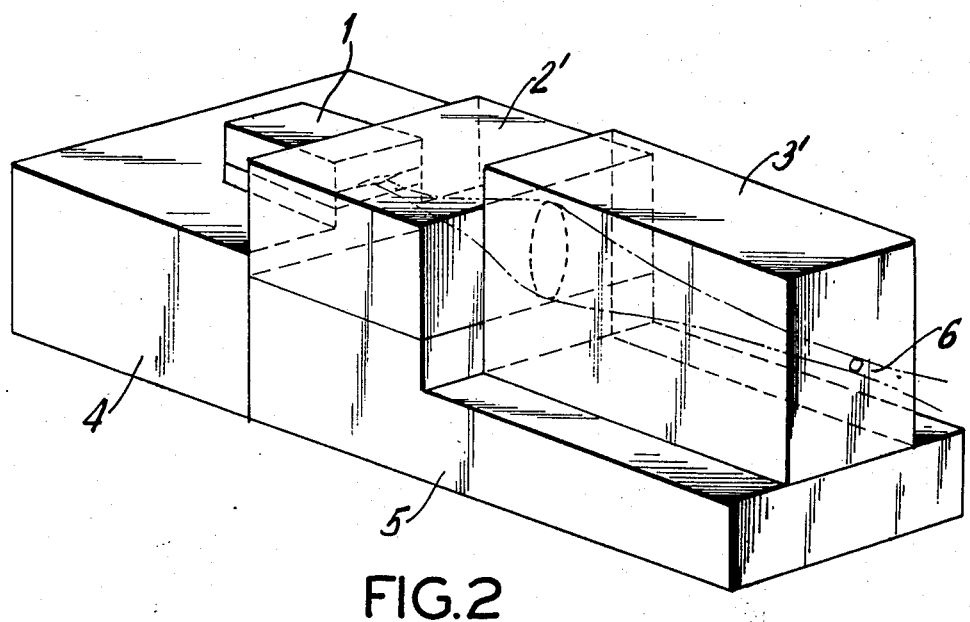

The other objects, features and advantages of the invention will become more apparent from the following detailed description taken in conjunction with the accompanying drawings, in which:

FIG. 1 is a perspective view of a light beam coupler according to a first embodiment of the invention; and FIG. 2 is a perspective view of a light beam coupler according to a second embodiment of the invention.

With reference to the embodiment of the invention shown in FIG. 1, there is shown a light beam coupler which comprises a first light focusing transmission body 2 which receives an output light beam having a flat cross-section that is produced by a semiconductor laser 1 installed on a heat sink 4. The light focusing transmission body transforms this flat beam into a light beam having a circular cross-section. A second light focusing transmission body 3 receives the circular beam and transforms that beam into a light beam having a predetermined spot size. The light focusing transmission bodies 2 and 3 are bonded in cascade onto a spacer 5 which is fastened to the heat sink 4 so that the axis of the output beam from the semiconductor laser 1 is colinear with the optical axes of the light focusing transmission bodies 2 and 3.

The first light transmission body 2 is fabricated in the following manner. A glass rod with a cross-sectional area, which may be, for purposes of example, an 0.3 × 2.1 mm, and having a lens function, is prepared by an ion exchange process. (One method of making such a light transmission medium is disclosed in U.S. Pat. No. 3,657,586.) According to this method, a light transmission body having the desired lens function can be obtained by suitably determining the shape of the cross-section of the glass rod as well as the time and temperature for the ion exchange process.

In the embodiment shown in FIG. 1, the glass rod is cut to a length of 2.5 mm for use as the light transmission body 2. This light transmission body is disposed with its thickness (0.3 mm) direction aligned with the direction perpendicular to the p-n junction plane of the semiconductor laser. Thus, in the first light transmission body, the value $a_x$ of $a$ in Eq. (1), which indicates the degree of light focusing effect in the direction perpendicular to the p-n junction plane, is approximately equal to 4.6 mm$^{-2}$ on condition that the refractive index $n_o$ of the glass rod is 1.55, and the difference in the refractive index, $\Delta n$, at the surface and the center of the lens is 0.08. Similarly, the value of $a_y$ of $a$ in the direction parallel to the p-n junction plane is approximately equal to 0.1 mm$^{-2}$. The focal lengths in the two directions are 0.796 mm and 2.87 mm, respectively.

Thus, the light focusing effect is greater in the direction perpendicular to the p-n junction plane than in the direction parallel thereto, and an output laser beam with a flat cross-section diverging in the direction perpendicular to the p-n junction plane could be transformed into a light beam with a circular cross-section about 100 microns in radius.

The second light transmission body 3 may have, for example, a length of 3.6 mm from a glass rod of 0.8 mm in diameter. The rod is subjected to an ion exchange process, such as that disclosed in British Pat. No. 1,266,521. This light transmission body has a refractive index distribution symmetrical about its center axis. In experiments, $n_0 = 1.55$, $\Delta n = 0.025$, $a = 0.19$ mm$^{-2}$, and $f = 1.48$ mm. Thus, with this second light transmission body, a light beam with a radius of 100 microns could be transformed into a light beam 6 having a radius of about 4 microns.

Referring to the embodiment of the invention illustrated in FIG. 2, there is shown a light beam coupler including a first light transmission body 2' which receives an output beam having a flat cross-section from a semiconductor laser 1 bonded onto a heat sink 4. Light transmission body 2' has the capability of transforming this flat light beam into a light beam with an elliptical cross-section. The elliptical beam is received by a second light transmission body 3' which is capable of transforming the elliptical cross-section beam into a light beam having a circular cross-section fitting a given, predetermined spot size. The light transmission bodies 2' and 3' are bonded in cascade onto a spacer, which is fastened to the heat sink 4 so that the axis of the output beam from the semiconductor laser 1 is colinear with the optical axes of the light transmission bodies 2' and 3'.

In one version of a light coupler constructed according to this invention, as illustrated in FIG. 2, the first light transmission body measured 0.5 mm in the direction perpendicular to the p-n junction plane, 1.53 mm in the direction parallel to the p-n junction, and 1.2 mm in the light propagating direction. In this light transmission body, the value of $a$ was found to be 1.7 mm$^{-2}$ in the direction perpendicular to the p-n junction, and 0.17 mm$^{-2}$ in the direction parallel thereto, on condition that $n_o = 1.55$ and $\Delta n = 0.08$. The focal lengths in the two directions were 0.495 mm and 3.3 mm, respectively.

Thus, the output beam with a flat-cross-section from the semiconductor laser 1 was transformed into a light beam with an elliptical cross-section having a 340 microns long major axis in the direction perpendicular to the p-n junction plane of the semiconductor laser 1 and a 280 microns long minor axis in the direction parallel thereto. In other words, the light beam at the output end of the first light transmission body 2' diverges at an angle slightly larger in the direction of the minor axis than in the direction of the major axis due to the effect of light diffraction. Then, in the second light transmission body, the value of the change in the refractive index distribution in its cross-sectional plane is made larger in the direction parallel to the p-n junction plane than in the direction perpendicular thereto, as opposed to that in the first light transmission body. The second light transmission body 3' measured 1.4 mm in the direction perpendicular to the p-n junction plane, 0.83 mm in the direction parallel thereto, and 6 mm in the light propagating direction. In this device, the value of $a$ was found to be 0.07 mm$^{-2}$ in the direction perpendicular to the p-n junction plane and 0.17 mm$^{-2}$ in the direction parallel thereto, on condition that $n_o = 1.55$, and $\Delta n = 0.025$. The focal lengths in the two directions were 2.44 mm and 2.52 mm, respectively. According to the embodiment, a light beam with a circular cross-section equal to a spot size of about 4 microns was obtained from the output laser beam.

In the second embodiment, the first and second light transmission bodies can easily be installed on the spacer 5, and mechanical stability can be obtained by virtue of the fact that the light transmission bodies are rectangular in shape.

It is to be understood that various modifications may be made to the principles of the invention disclosed herein. For example, instead of one or both of the light transmission bodies having lens functions, light focusing transmission bodies having the function of a lens in only one direction in the plane of cross-section perpendicular to the light propagating axis, the so-called, one dimensional lens, may be used. Here, in the first light transmission body, the direction in which the lens function works is aligned with the direction perpendicular to the p-n junction plane of the semiconductor laser, and in the second light transmission body, it is aligned with the direction parallel thereto, whereby the output laser beam is transformed into a light beam with a circular cross-section fitting the desired spot size.

According to the invention, a transparent medium having no lens function may be interposed between the semiconductor laser and the first light transmission body, as well as between the first and second light transmission bodies.

The light beam coupler of the invention has been described herein for use in light-coupling to optical fibers. In addition to this application, the light beam coupler of the invention can be used in many other ways. For example, by suitably determining the optical constants of the first and second light transmission bodies, the invention can be used to provide an output beam with a large cross-section for propagation in the air.

As has been described above, the light beam coupler of the invention is readily able to transform an output laser beam with a flat cross-section into a light beam with a circular cross-section equal to a desired spot size. The principles of the invention make it possible to reduce the size and weight of the light coupler device, which is not available by the use of conventional optical lenses. Furthermore, because two light focusing transmission bodies are used instead of one light transmission body as in the prior art devices, a highly efficient light-focusing effect is realized. In addition, the light beam coupler of the invention is mechanically stable and suited for use with a semiconductor laser in an integrated structure, without detracting from the advantages—small size and light weight—of semiconductor lasers.

Although a few preferred embodiments of the invention have been disclosed herein in detail, it is to be understood that this is for the purpose of illustrating the invention and should not be construed as necessarily limiting the scope of the invention.

What is claimed is:

1. A light beam coupler for use in transforming an output beam with a flat cross-section into a light beam with a substantially circular cross-section; said light beam coupler comprising a first light transmission body disposed in the vicinity of a semiconductor laser, and a second light transmission body disposed in an optically coaxial cascade relationship with said first light transmission body wherein, in the plane of cross-section perpendicular to the optical axes of said first and second light transmission bodies, the refractive index distribution decreases substantially proportionally to the square of the distance from said optical axis in at least one direction, and the gradients $a_x$ and $a_y$ for said refractive index distribution meet the condition $a_x > a_y$ (where $a_y$ can be zero) in said first light transmission body, and the condition $a_x \leq a_y$ (where $a_x$ can be zero) in said second light transmission body, the gradient $a_x$ being taken in the direction perpendicular to the p-n junction plane of the semiconductor laser, and the gradient $a_y$ in the direction parallel thereto.

2. The light beam coupler of claim 1, in which said first light transmission body comprises means for transforming the flat cross-sectional output beam of the laser to an intermediate beam having an substantially circular cross-section of a first diameter, and said second light transmission body comprises means for transforming said intermediate beam to an output beam having a substantially circular cross-section of a second diameter less than said first diameter.

3. The light coupler of claim 1, in which said first light transmission body comprises means for transforming the flat cross-sectional laser output beam to an intermediate beam having a substantially elliptical cross-section, and said second light transmission body comprises means for transforming said beam to an output beam having a substantially circular cross-section beam of a reduced size, as compared to said intermediate beam.

4. The light coupler of claim 1, in which said first light transmission body is rectangular in cross-section, and said second light transmission body is substantially circular in cross-section.

5. The light coupler of claim 1, in which said first and second light transmission bodies are rectangular in cross-section, the major dimension of said first light transmission body extending in a direction parallel to the major dimension of the flat cross-sectional laser beam, and the major dimension of said second light transmission body extends in a direction perpendicular thereto and in a direction parallel to the major axis of said elliptical cross-sectional elliptical beam.

6. The light coupler of claim 1, further comprising means for mounting and spacing said first and second light transmission bodies from one another, and for aligning the optical axes of said first and second light transmission bodies with one another and with the output beam of the semiconductor laser.

* * * * *

UNITED STATES PATENT OFFICE
CERTIFICATE OF CORRECTION

Patent No. 3,894,789      Dated July 15, 1975

Inventor(s) Kohroh Kobayashi and Atsumfumi Ueki

It is certified that error appears in the above-identified patent and that said Letters Patent are hereby corrected as shown below:

In the caption, Foreign Application Priority Data should e indicated as follows:

-- August 2, 1973   Japan .......... 48/87348.--

Signed and Sealed this sixth Day of January 1976

[SEAL]

Attest:

RUTH C. MASON
*Attesting Officer*

C. MARSHALL DANN
*Commissioner of Patents and Trademarks*